United States Patent [19]

Rosenberg

[11] Patent Number: 4,485,294
[45] Date of Patent: Nov. 27, 1984

[54] DEVELOPER FOR PHOTOTHERMOGRAPHIC PAPER

[75] Inventor: David B. Rosenberg, Ann Arbor, Mich.

[73] Assignee: Phoenix Medical Corporation, Ann Arbor, Mich.

[21] Appl. No.: 476,617

[22] Filed: Mar. 18, 1983

[51] Int. Cl.$^3$ .............................................. H05B 1/02
[52] U.S. Cl. .................................... 219/216; 219/388; 346/76 R; 432/59; 432/230
[58] Field of Search ................. 219/216, 216 PH, 388, 219/470, 483, 484; 355/3 FU, 14 FU; 432/227, 230, 231, 59; 346/76 R

[56] References Cited

U.S. PATENT DOCUMENTS

| | | | |
|---|---|---|---|
| 3,558,853 | 1/1971 | Schluntz | 219/216 |
| 3,585,917 | 3/1968 | Griffith | 219/216 |
| 3,588,445 | 6/1971 | Hopkins | 219/216 |
| 3,745,307 | 7/1973 | Peek | 219/216 |
| 3,813,677 | 5/1974 | Shimotsuma | 219/216 PH |
| 3,934,112 | 1/1976 | Lakhani | 219/388 |
| 4,275,959 | 6/1981 | Jones | 219/388 |
| 4,354,095 | 10/1982 | de Vries | 432/230 |

OTHER PUBLICATIONS

Dyer, S., "Printing Energy Control for a Thermal Printer", IBM Tech. Disc. Bulletin, vol. 24 No. 7B Dec. 1981, p. 3973.

Primary Examiner—C. L. Albritton
Assistant Examiner—Teresa J. Walberg
Attorney, Agent, or Firm—Reising, Ethington, Barnard, Perry & Milton

[57] ABSTRACT

Apparatus is provided for obtaining optimal development of photothermographic paper at different paper speeds and with intermittent paper movement. This is accomplished by a heater platen with plural heaters which are selectively energized in accordance with a function of paper speed. Also a fan for cooling of the platen is selectively energized in accordance with temperature. For this purpose, a temperature signal is produced corresponding to the temperature of each heater and, a speed signal is produced corresponding to the paper speed; if desired, a contrast signal can be produced corresponding to the degree of contrast desired in the development of the paper. A logic device, preferably a microprocessor operating under a program control, processes the signals and controls the energization of the heaters and the fan. More particularly, the platen is heated by plural electrical resistance heaters and is provided with a temperature sensor for each resistance heater. Energizigation of each heater is controlled by the microprocessor to apply voltage pulses at a controlled pulse rate in accordance with temperature. The fan includes an intake and discharge fan for cooling the platen. Energizigation of the fans is controlled by the microprocessor to provide a controlled pulse rate for speed control of the fans. The heater platen is of such construction that it has high thermal conductivity and low thermal inertia to permit fast temperature change.

19 Claims, 10 Drawing Figures

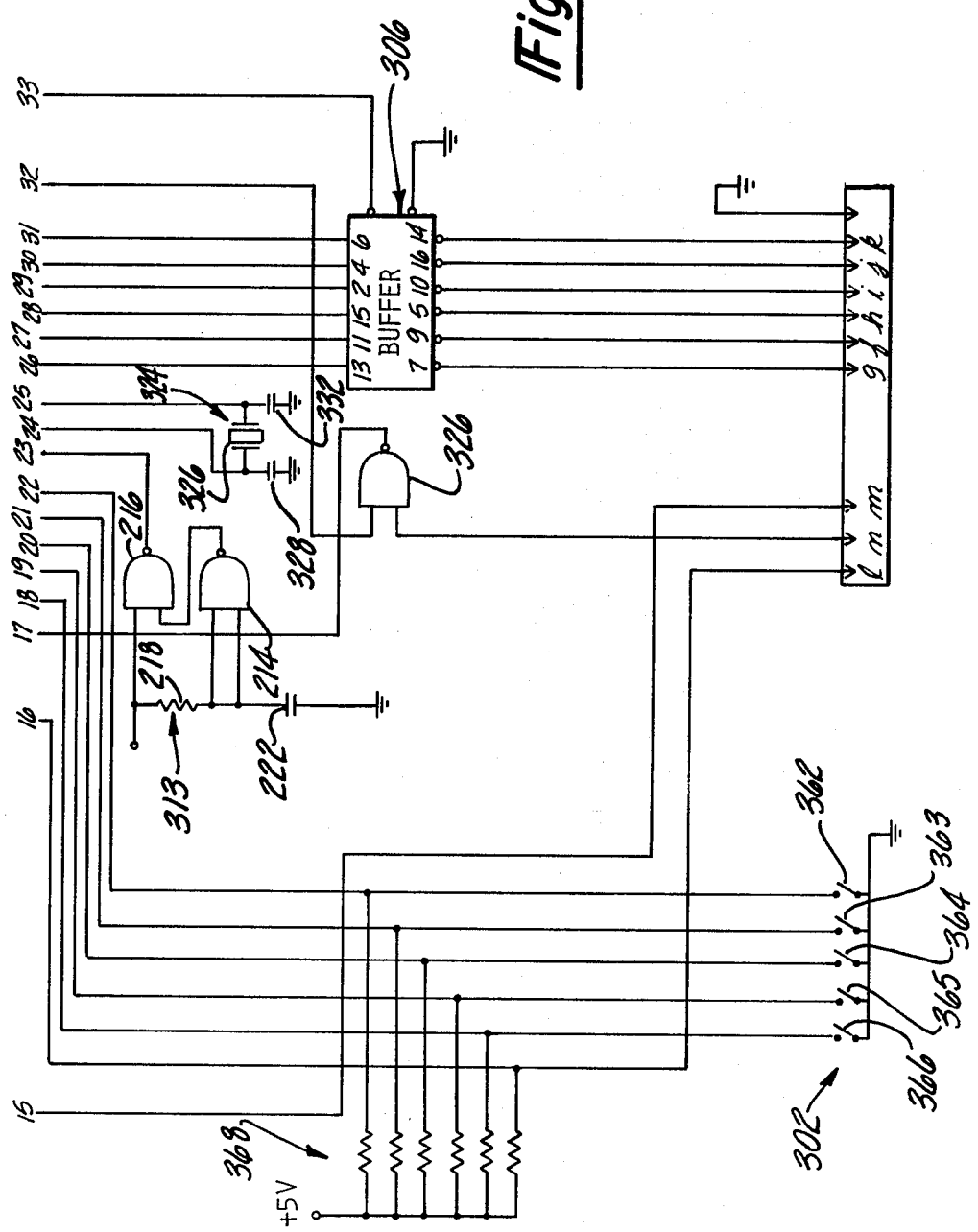

DEVELOPER FOR PHOTOTHERMOGRAPHIC PAPER

FIELD OF THE INVENTION

This invention relates to developing apparatus for photothermographic paper and more particularly it relates to a control system for obtaining optimal image development.

BACKGROUND OF THE INVENTION

Photothermographic paper, particularly silver-based paper is widely used for many medical and industrial applications. The term "dry silver" refers to a light-sensitive photothermographic coating. In the dry silver process for imaging, light produces an invisible latent image on the paper and the image is developed for viewing by the application of heat alone. This dry silver imaging process affords many advantages because it is simple and fast, does not require wet developing and is low cost. It is now commonly used in computer data recording and also in such applications as medical imaging, oil well logging, laser wirephotos and photo typesetting.

In developing dry silver paper, there has been a problem of obtaining an optimal contrast. Contrast is a function of temperature and dwell time, i.e. the time that the paper is exposed to the elevated temperature. The temperature used for developing the paper typically ranges between 250° F. and 280° F. As a practical matter, development times may range from three to twenty seconds. Optimal development is possible over a wide range of temperature and dwell time; a short dwell time requires high temperature and conversely, a long dwell time requires a low temperature. Underdevelopment produces a low maximum image density and overdevelopment increases minimum highlight density.

The problem of temperature control is further aggravated in applications, such as medical recordings on an echocardiograph, where the recording process is stopped periodically, i.e. the paper is driven intermittently. This causes the paper to dwell in the developer for an extended interval with the tendency to produce excessively overdeveloped paper and obliterate the recorded images.

A general object of this invention is to provide an improved developer for photothermographic paper and to overcome certain disadvantages of the prior art.

SUMMARY OF THE INVENTION

In accordance with this invention, apparatus is provided for obtaining optimal development of photothermographic paper at different paper speeds and with intermittent paper movement. This is accomplished by a heater platen with plural heaters which are selectively energized in accordance with a function of paper speed. Also fan means for cooling of the platen is selectively energized in accordance with temperature. For this purpose, means are provided for producing a temperature signal corresponding to the temperature of each heater and, means are provided for producing a speed signal corresponding to the paper speed; if desired, means are provided for producing a contrast signal corresponding to the degree of contrast desired in the development of the paper. Logic means, preferably a microprocessor operating under a program control, processes the signals and controls the energization of the heaters and the fan means. More particularly, the platen is heated by plural electrical resistance heaters and is provided with a temperature sensor for each resistance heater. Energizing means for each heater is controlled by the microprocessor to apply voltage pulses at a controlled pulse rate in accordance with temperature. The fan means comprises an intake and discharge fan for cooling the platen. Energizing means for the fans is controlled by the microprocessor to provide a controlled pulse rate for speed control of the fans. The heater platen is of such construction that it has high thermal conductivity and low thermal inertia to permit fast temperature change.

A more complete understanding of this invention may be obtained from the detailed description that follows taken with the accompanying drawings.

DESCRIPTION OF THE DRAWINGS

FIGS. 6A and 6B constitute a schematic diagram of the processor circuit; and

BEST MODE FOR CARRYING OUT THE INVENTION

Figure 1:
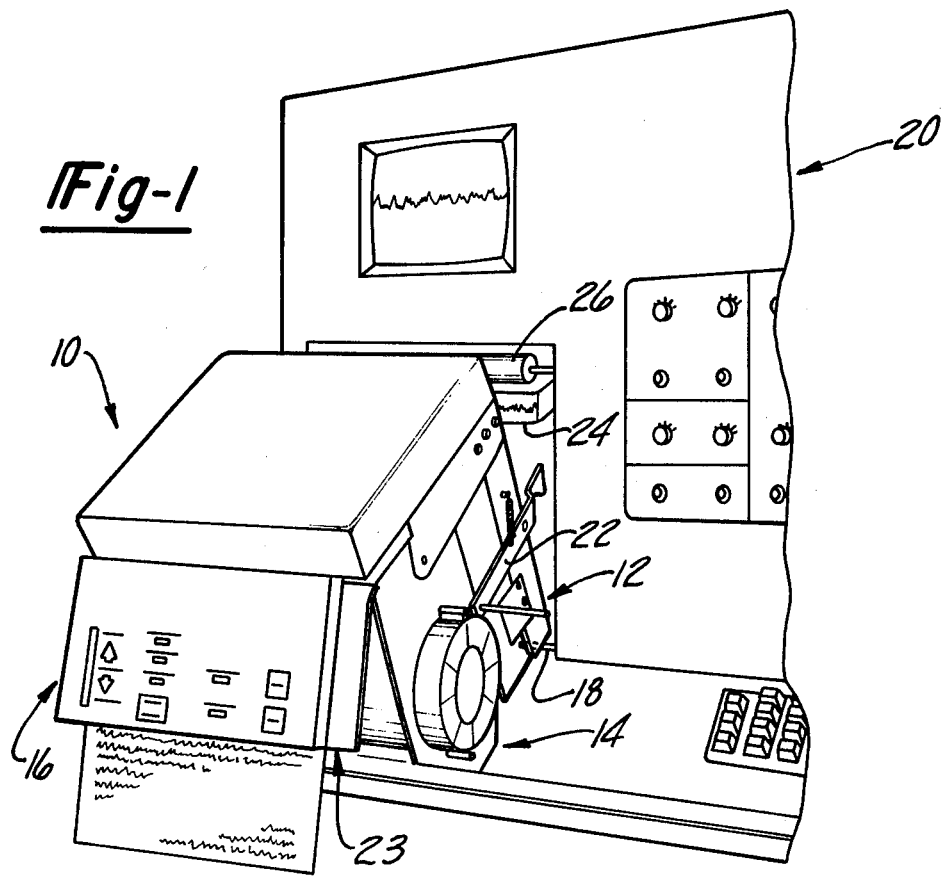
FIG. 1 is a pictorial view of the developer of this invention as it is installed on an associated apparatus for exposing the paper.

Referring now to the drawings, there is shown an illustrative embodiment of the invention in a dry silver paper developer especially adapted for use with medical recording equipment. It will be appreciated as the description proceeds that the developing apparatus is useful with different types of equipment in different applications.

Referring now to FIG. 1, the developer 10 is depicted in a coacting relationship with a Holter reader 20, a well known instrument for playing back a tape recording of an electrocardiogram and displaying it on a cathode ray tube. The developer 10, in general, comprises a paper supply compartment 12, a heater chamber 14, and a control panel 16. The developer 10 is removably mounted on the reader 20 by a pivotal connection 18 at the base and a pair of latches 22, one on each side of the developer. The developer 10 is shown in an intermediate position as it is being installed with the pivotal connection 18 engaged but with the upper part tilted away from the reader 20 and the latches 22 open. The developer is fully installed for operation by tilting it forwardly on the pivot connection 18 until it is in face-to-face engagement with the reader 20 with the latches 22 engaged. The developer 10 is removably installed on the reader 20 so that it may be removed for replenishing the paper supply. It is noted that the photothermographic paper from the paper compartment 12 is fed over the rear face of the developer 10 and thence through the heater chamber 14 to the exit chute 23 under the control panel 16. The paper is exposed by passing it over the rectangular screen 24 of a cathode ray tube which produces a visible light trace on the screen. In operation of the reader 20 and developer 10, the operator controls the speed of the paper drive at a desired value by means of a speed control on the reader. The reader 20 includes a drive roller 26 which is driven at a speed according to that selected by the operator.

Figure 2:
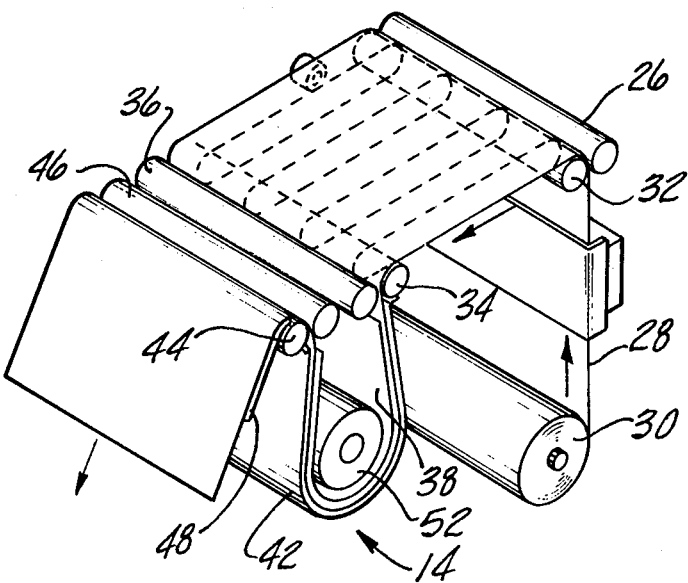
FIG. 2 is a diagrammatic representation of the developer.

The developer 10 is shown digrammatically in FIG. 2. The paper 28 from a paper roll 30 passes between a driven roller 32 and the drive roller 26, the paper being moved at a rate corresponding to the speed of the drive roller 26. The paper is gripped between a driven roller 34 and an idle roller 36 and advanced into the heater chamber 14. In the heater chamber the paper passes between a U-shaped heater platen 38 and a U-shaped enclosure 42. The paper is gripped between a driven roller 44, an idle roller 46 and is advanced to the paper exit chute 48. As will be described subsequently, the temperature of the heater platen 38 is controlled continuously by controlled energization of electric resistance heaters. This temperature control is augmented by forced air flow through the heater chamber 14 between the inner surface of the heater platen 38 and the outer surface of a cylindrical core 52.

Referring now to the exploded view of FIG. 3, the structure of the developer 10 will be described further. A frame 54 supports the paper supply compartment 12 which receives a light tight box (not shown) which contains the roll 30 of the paper 28. A pair of pivot brackets 58 are secured to the frame and adapted to be pivotally mounted on a rod in the reader 20. When the developer 10 is tilted into engagement with the reader 20, the latches 22 engage a latch keeper (not shown) in the reader 20.

A presser plate 60 is mounted on the frame 54 and is spring urged toward the screen 24. The paper from the paper compartment 12 is fed between the presser plate 60 and the screen 24 and is held in close engagement with the screen by the presser plate. A horizontal frame 62 is mounted on the vertical frame 54 and supports the paper feed mechanism. The paper feed mechanism comprises the driven roller 32, the driven roller 34 and idle roller 36 and the driven roller 44 and the idle roller 46. The driven roller 32 is drivingly connected with the driven roller 34 by a set of drive belts 64. The driven roller 32 is also provided with a set of friction bands 66. The paper is advanced from the presser plate 60 to the drive roller 26 and passes between the drive roller 26 and the driven roller 32. The paper is frictionally engaged between the drive roller 26 and the driven roller 32 and motion is imparted to the paper by the drive roller 26. The movement of the paper, in turn, imparts rotation to the driven roller 32. The paper is advanced along the frame 62 to the driven roller 34 which is driven by the belts 64. The paper passes between the driven roller 34 and the idle roller 36 and then enters the heater chamber 14, which will be described subsequently. The paper advances through the heater chamber 14 to the driven roller 44 and passes between it and the idle roller 46. The driven roller 34 is provided with a driving pulley 68 and the driven roller 44 is provided with a driven pulley 72. The pulleys 68 and 72 are drivingly connected by a belt 74. The exit chute 23 is provided by a lower guide plate 76 which is mounted on the horizontal frame 62 and an upper guide plate 78 which constitutes the end section of the cover plate 82 which is secured to the frame 62.

Figure 3:
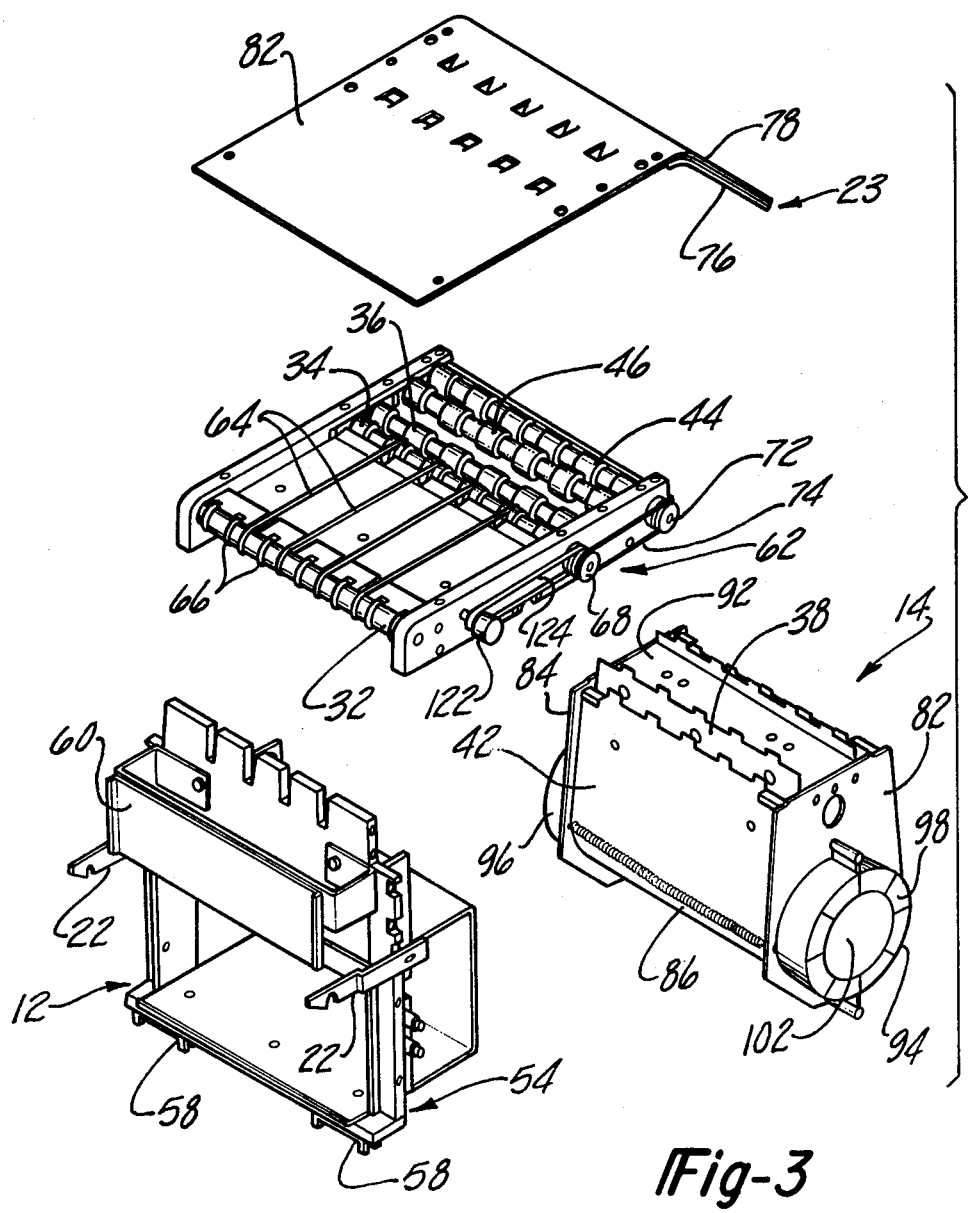
FIG. 3 is an exploded view of the developer.
Figure 4:
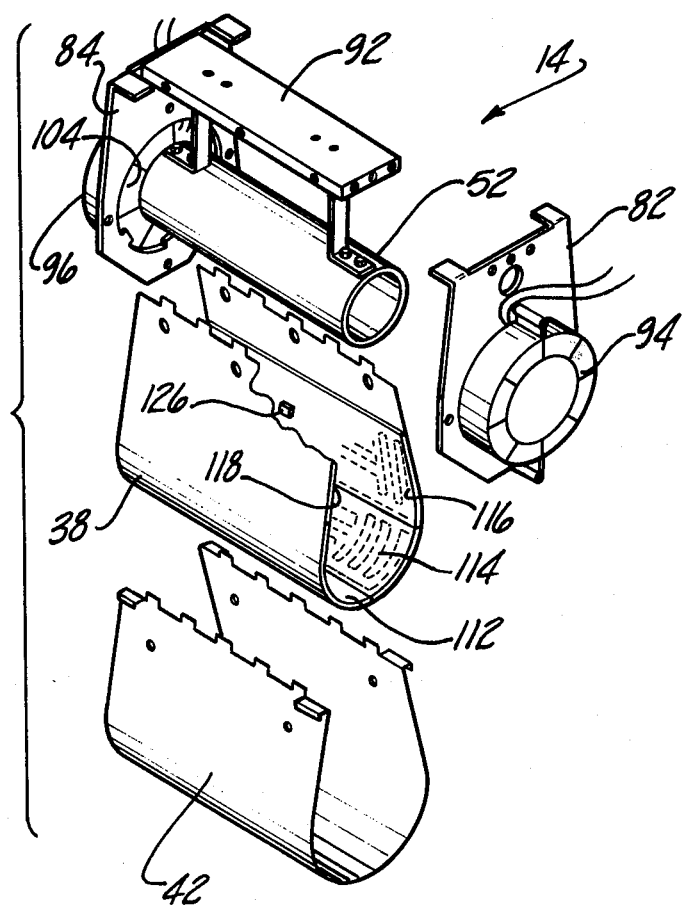
FIG. 4 is an exploded view of the heater cavity.

The heater cavity 14, as shown in FIGS. 3 and 4, comprises an outer U-shaped enclosure 42 and a pair of end plates 82 and 84. The end plates are mechanically interlocked with the enclosure 42 and the subassembly is held together by a pair of tension springs 86, one on each side. A U-shaped heating platen 38 is disposed within the enclosure 42 and is supported by a mounting plate 92 which, in turn, is secured to the horizontal frame 62. The outer wall of the heating platen 38 is spaced from the inner wall of the enclosure 42 to provide a paper path through the heater chamber 14.

The heater chamber 14 is provided with an intake fan 94 and a discharge fan 96 which are mounted respectively on the end plates 82 and 84. The fan 94 has an annular air flow passage 98 between the motor 102 and the outer housing. Similarly, the fan 96 has an annular air flow passage 104 between the motor and the outer housing. In order to guide the air flow through the heater chamber, along the inner surface of the heater platen 38, a cylindrical core 52 is disposed between the fans 94 and 96. The cylindrical core 52 is of the same diameter as the motors 106 and 102 and is supported in alignment therewith from the mounting plate 92. Accordingly, the air flow through the heater chamber is confined to the space between the inner surface of the heater platen 38 and the outer surface of the cylindrical core 52.

The heater platen 38, shown in FIG. 4 is provided with a set of heaters 112, 114, 116 and 118. The heaters are disposed on the inner surface of the heater platen 38 and each plate extends along the length of the platen. Each heater is an electric resistance heater comprising an electrical resistance embedded in a sheet of silicone rubber which is bonded to the surface of the platen 38. The configuration of the resistance is such that the space distribution of heat provides uniform temperature across the width of the heater. Each of the heaters is energized separately from the others with a controlled current flow, as will be described subsequently. The heater platen 38 is constructed of a thin sheet metal, preferably aluminum, so as to have a high degree of thermal conductivity and a low thermal inertia. The outer surface of the heater platen 38 is coated with a low friction material such as Teflon.

For the purpose of measuring the speed of the paper through the developer 10, an encoder 122 is mounted on the frame 62 and is driven from the pulley 68 by a drive belt 124. The encoder is a rotary optical encoder which produces a train of pulses having a pulse repetition rate corresponding to the rotational speed of the encoder shaft and hence corresponding to the paper speed. Each of the heaters 112, 114, 116 and 118 is provided with a temperature sensor in the form of a thermistor embedded in the heater and responsive to the temperature of the platen. As shown in FIG. 4, the heater platen 116 is provided with a thermistor 126; each of the other heaters is provided with a thermistor, as will be described subsequently.

The Heater Control System

As noted above, the individual heater plates 112, 114, 116 and 118 are energized separately to provide a controlled temperature which is uniform over the corresponding section of the heater platen. For this purpose, a heater control system is provided which comprises a control circuit and a processor circuit which will be described presently.

The Control Circuit

Figure 5A:
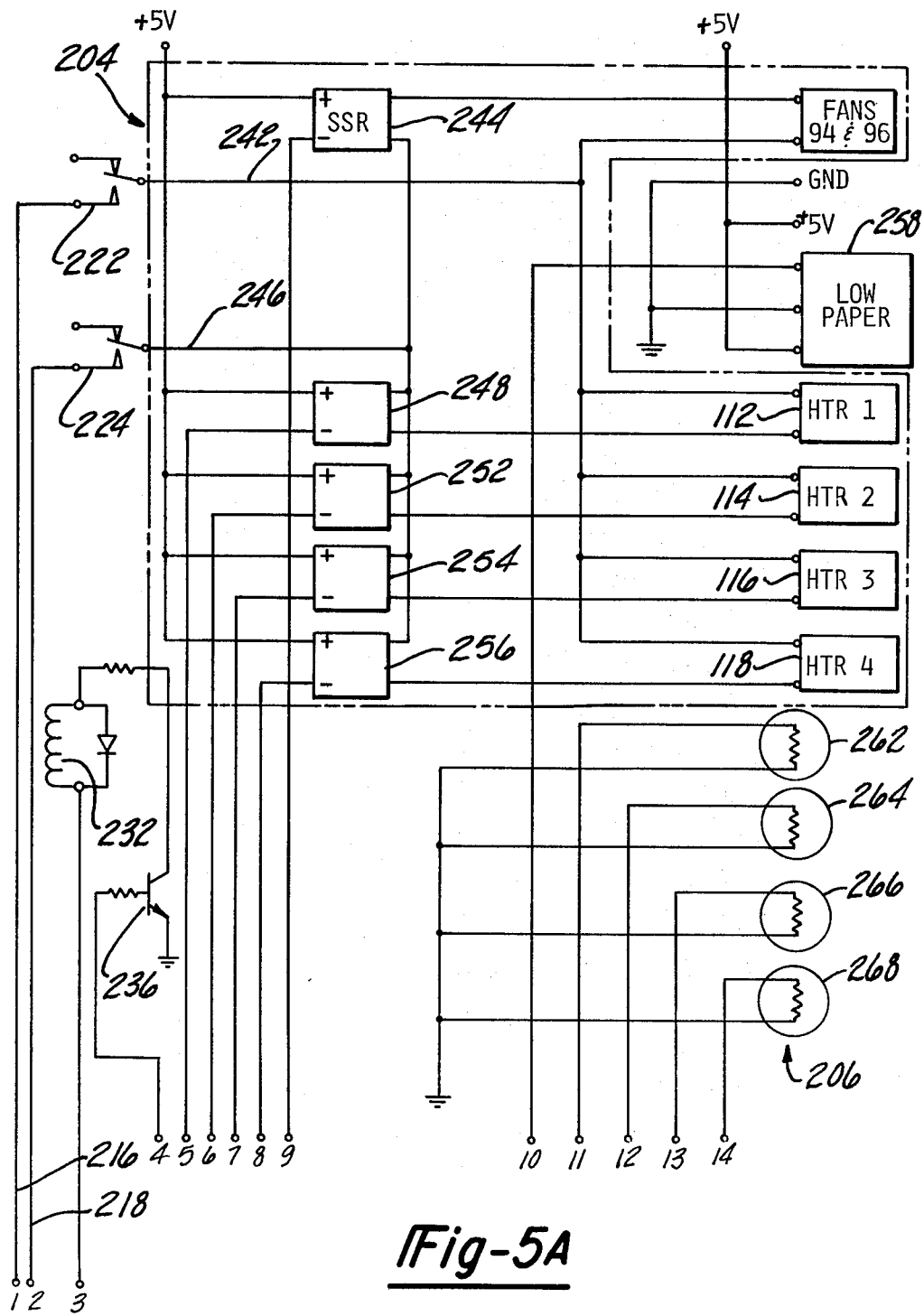
FIGS. 5A and 5B taken together constitute a schematic diagram of the control circuit.
Figure 5B:
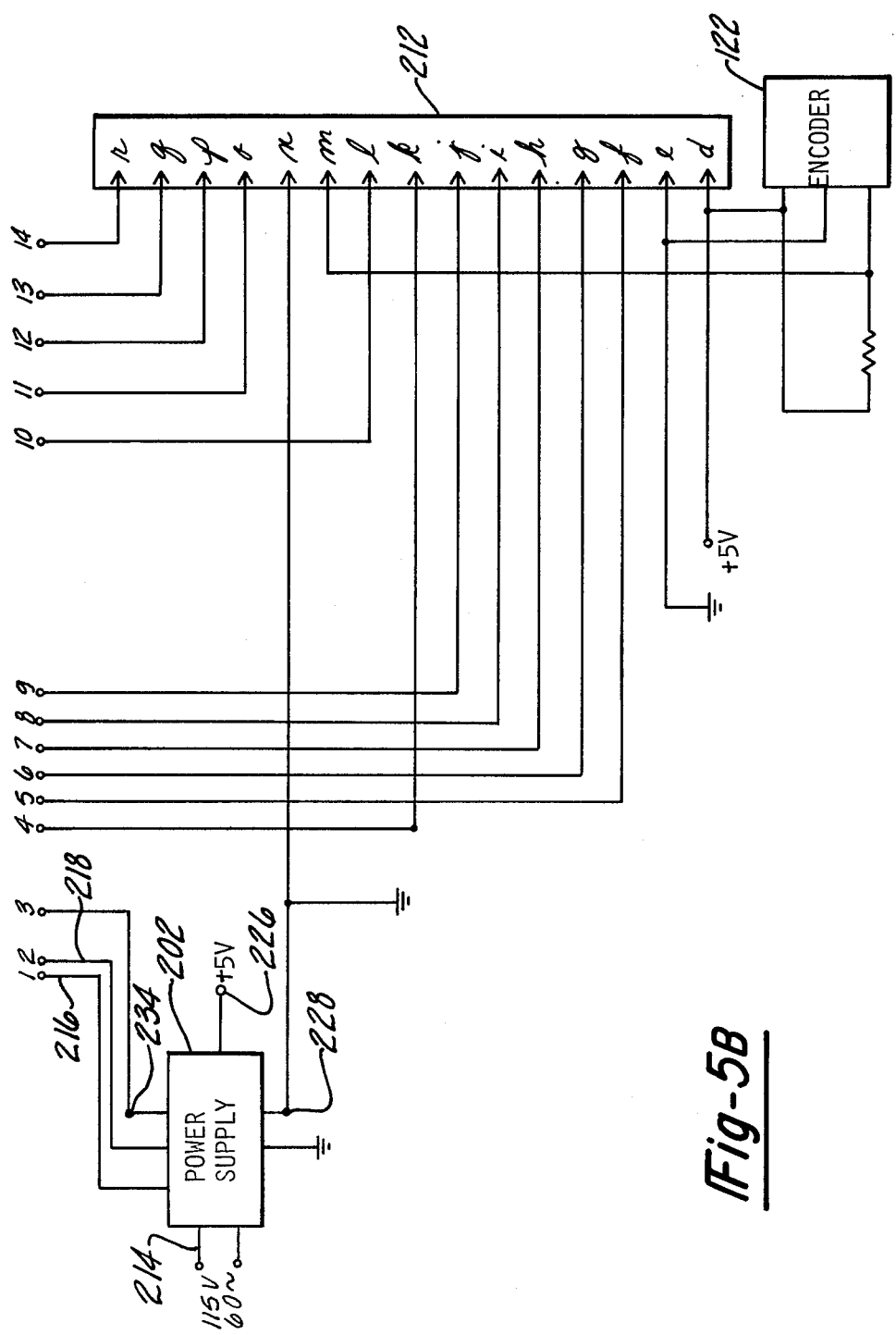
Figure 6A:
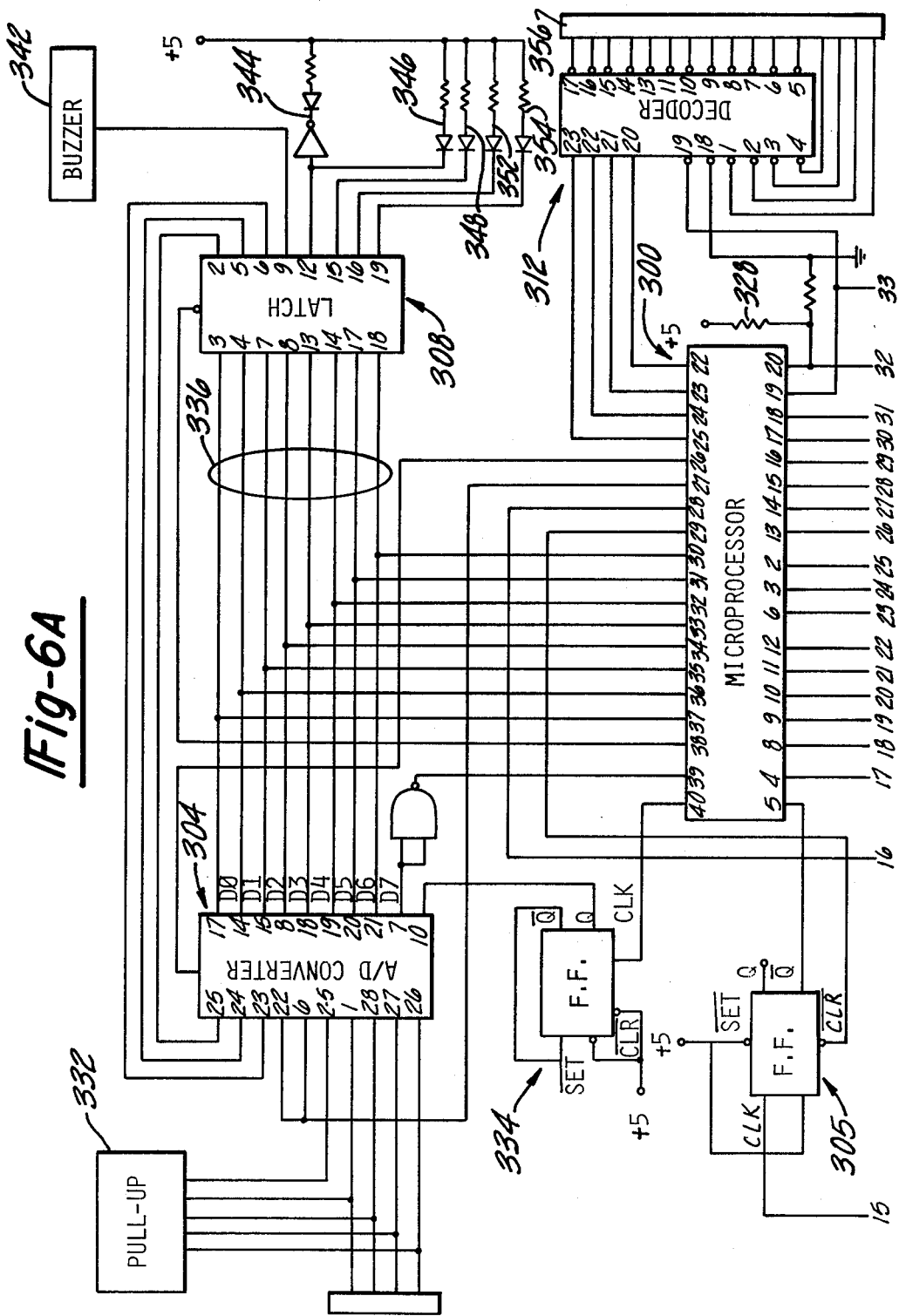

As shown in FIGS. 5A and 5B, the control circuit comprises, in general, a power supply 202, an energizing circuit 204 for the heaters and fans, a thermistor input circuit 206, the encoder 122 and connection points 212 to the processor circuit shown in FIGS. 6A and 6B.

The power supply 202 has input terminals 214 adapted to be connected with a supply voltage source of 120 volts 60 Hz AC. It supplies an output voltage of 120 volts AC on output terminals 216 and 218 which are connected with relay contacts 222 and 224. The power supply also develops a regulated DC voltage of 5 volts on output terminal 226. This logic level voltage is applied at various points in the control circuit and in the processor circuit. An unregulated DC output voltage is provided on output terminal 234. Additionally, the power supply 202 produces a monitor voltage of 8 volts AC on an output terminal 228. This monitor voltage is applied through a connector n to the processor circuit as a synchronising line voltage signal.

In order to apply the AC line voltage to the energizing circuit 204 for the heaters and fans, a relay 232 is provided. This relay is energized from the DC output terminal 234 of the power supply through a transistor 236. The relay 232 includes the relay contacts 222 and 224 which are closed when the relay is energized upon start up of the power supply. The transistor 236 has its input connected through a connector k to the processor circuit for receiving a logic level control signal, as will be described subsequently.

The fans 94 and 96 and the heaters 112, 114, 116 and 118 are energized by the energizing circuit 204. The fans 94 and 96 have one terminal connected directly to the AC supply line 242 and the other terminal is connected through a solid state relay 244 to the other supply line 246. The solid state relay 244 receives a logic level control signal through a connector j from the processor circuit, as will be described subsequently. Similarly, the heaters 112, 114, 116 and 118 each have one terminal connected directly with the AC supply line 242 and the other terminal connected through solid state relays 248, 252, 254 and 256, respectively. The solid state relays 248, 252, 254 and 256 are controlled by logic level signals from the processor circuit through the connectors f, g, h and i, respectively, as will be described subsequently.

A low paper detector 258 has one terminal connected to the logic level voltage supply, a second terminal connected to ground and a third terminal is connected through the connector 1 to the processor circuit to supply a logic signal thereto, as will be described subsequently.

As described above, each of the heaters is provided with a thermistor as a temperature sensor. Thermistors 262, 264, 266 and 268 are connected respectively through connectors o, p, q and r as inputs to the processor circuit, as will be described subsequently.

The encoder 122, as previously described, has one terminal connected to a logic level voltage, a second terminal connected to ground and a third terminal connected through a connector m to the processor circuit to apply the speed signal thereto, as will be described subsequently.

A connector d is connected to the logic level voltage terminal and applies the logic level voltage to the processor circuit. Similarly, a connector e is connected to ground and applies it to the processor circuit

The Processor Circuit

The processor circuit, shown in FIGS. 6A and 6B, coacts with the control circuit of FIGS. 5A and 5B, to develop control signals for the heaters and fans so as to maintain temperatures in the heater cavity which produce optimal development of the dry silver paper. The processor circuit comprises logic means which accepts as input, a paper speed signal, a set of heater temperature signals, and keyboard signals for setting desired contrast level for developing the paper. The logic means produces, as output signals, heater control signals, fan control signals and contrast indicator signals. Additionally, it may provide certain warning signals for the operator.

The processor circuit comprises a microprocessor 300 which is a single chip microprocessor having a read-only memory for program storage as well as a random access memory for the required read/write functions. The microprocessor 300 is preferably a type MC 6801/68701, avaliable from Motorola Corporation. The processor circuit further includes, in general, a keyboard 302 for inputting manual commands to the microprocessor. It also includes an analog-to-digital converter 304 for inputting the temperature signals to the microprocessor and a flip-flop 305 for inputting the paper speed signal to the microprocessor. Additionally, a low paper signal is inputted to the microprocessor through the conductor 1. Also, an AC line synchronising signal is inputted to the microprocessor through the connector m. The processor also includes, in general, a buffer 306 for outputting the control signals to the heaters and fans. It is also provided with a latch 308 for outputting certain warning signals for warning lamps and a buzzer at the control panel. Also, it includes a decoder 312 for outputting contrast signals for the control panel in response to operator selection of contrast level. Additionally, the processor circuit includes as an output, a control relay signal on connector k for the control circuit.

With continued reference to FIGS. 6A and 6B, the processor circuit will now be described in greater detail. For start-up of the processor circuit, the reset signal generator is provided. This signal generator comprises a Schmidt trigger circuit including a pair of NAND gates 214 and 216. A resistor 218 and capacitor 222 are connected in series across the logic voltage source. Both inputs of the gate 214 are connected to the junction of the resistor and capacitor and one input of the gate 216 is connected to the logic voltage source. The output of the gate 214 is connected to the other input of gate 216 which produces the reset signal and is connected directly to pin 6 of the microprocessor 300.

A clock circuit 324 provides the basic timing clock signals for the microprocessor. It comprises a crystal 326 having its terminal connected to ground through capacitors 328 and 332. The crystal provides a basic clock signal of 4 mhz and has one terminal connected to pin 2 of the microprocessor and the other terminal connected with pin 3 of the microprocessor.

The AC line synchronising signal from the power supply in the control circuit is supplied to the processor circuit through the connector n. As shown in FIG. 6B, the synchronising signal is supplied from connector n to one input of a NAND gate 326. The other input of the NAND gate 326 is connected with pin 20 of the microprocessor and also it is connected through a resistor 328 with the logic level supply voltage. The output of the NAND gate 326 provides the AC synchronising signal to a non-maskable interrupt input pin 4 of the microprocessor. When pin 20 is at logic high, the output of gate 326 is held low. As soon as pin 20 of the microprocessor goes to logic high it represents a non-maskable interrupt enable signal which causes the NAND gate 326 to open and the AC synchronising signal is applied to pin 4. The microprocessor develops an output enable signal on pin 19. This enable signal is applied to pin 1 of the buffer 306 and to the pin 19 of the decoder 312.

The paper speed signal from the encoder 122 in the control circuit is supplied through the connector m to the clock input of the flip-flop 305. The Q-not output is connected with the interrupt request input pin 5 of the microprocessor. In response to the receipt of the signal on pin 5, the microprocessor produces an acknowledgement signal on pin 29 which is applied to the clear input of the flip-flop 305. Accordingly, the flip-flop 305 supplies the pulse train of the speed signal from the encoder to the pin 5 of the microprocessor which determines the paper speed in accordance with the pulse repetition rate of the pulse train.

The analog-to-digital converter 304 is adapted to convert the analog temperature signals from the thermistors 262, 264, 266 and 268 into digital signals for input to the microprocessor. The analog signals from the thermistors are supplied from the control circuit through the connectors o, p, q and r to the pins 26, 27, 28 and 1, respectively, of the analog-to-digital converter 304. The data output lines D0 through D7 are connected respectively to the pins 17, 14, 15, 8, 18, 19, 20 and 21 of the converter 304. A set of pull-up resistors 332 are connected with the pins 1, 28, 27 and 26 of the converter. The start signal for the analog-to-digital converter 304 is developed by the microprocessor on pin 27 and applied to pins 6 and 22 of the converter. A clock signal of 1 mhz is developed by the microprocessor at pin 40 and is applied to the clock input of a flip-flop 334. The Q output of the flip-flop is connected to the clock input at pin 10 of the analog-to-digital converter 304. The data output lines from the analog-to-ditigal converter 304 are connected through the bus 336 to pins 30 through 39 of the microprocessor. The analog-to-digital converter 304 develops a control signal on pins 23, 24 and 25 which are connected to the latch 308 at pins 2, 5 and 6. This control signal determines which signals on the data input pins of the latch to accept at a given time. The pin 7 of the analog-to-digital converter 304 develops an EOC signal which applied through an inverter 338 to the pin 39 of the microprocessor. The microprocessor develops a tri-state signal on pin 26 which is connected to the pin 9 of the analog-to-digital converter 304. When the tri-state signal is at logic low, the analog-to-digital converter 304 is effectively isolated from the bus 336 and effectively removes it from the circuit. When the tri-state signal is high, the analog-to-digital converter is effectively coupled with the bus 336 to supply the data signals to the input of the microprocessor.

The latch 308 receives data signals on the bus 336 from the microprocessor and controls the energization of the warning lamps and the buzzer at the control panel. For this purpose, the data input is applied to pins 18, 17, 14, 13, 8, 7, 4 and 3 of the latch from the pins 30 through 37 of the microprocessor. As noted above, the control signal from the analog-to-digital converter 304 is applied to the latch 308 at pins 2, 5 and 6 to control or determine which of the data signals is to be developed on the output pins of the latch at a given time. The microprocessor develops a latch signal on pin 38 which is connected to the latch input pin 11. A latch signal causes the selected data signals to be developed and to be held on the output pins of the latch 308. When a tone signal is developed by a microprocessor the latch develops the tone signal on the output pin 9 which is applied to the buzzer 342. A ready/wait signal from the microprocessor is developed on pin 12 of the latch which is connected with the wait indicating circuit 344 and the ready indicating circuit 346. An over-temperature signal from the microprocessor is developed by the latch 308 on the output pin 15 and applied to the over-temperature indicator 348. A heater fault signal from the microprocessor is developed by the latch 308 on the output pin 16 which is connected with the heater fault indicator circuit 352. The low paper signal from the microprocessor is developed on the latch 308 at the output pin 19 and applied to the low paper indicator circuit 354.

The keyboard 302 on the control panel provides for manual input of certain commands to the microprocessor. The keyboard switches 362 through 366 are connected through respective pull-up resistors 368 with the logic level voltage source. Keyboard switch 362 is connected with pin 12 of the microprocessor and when it is closed it turns the system off. Switch 363 is connected with pin 11 of the microprocessor and turns the system on. Switch 364 is connected with pin 10 of the microprocessor and supplies an increase signal for the contrast level; switch 365 is connected with pin 9 of the microprocessor and supplies a decrease signal for the contrast level. Switch 366 is connected with pin 8 and supplies an alarm silence signal to the microprocessor to shut the alarm off.

As noted above, the operator may manually influence the development of the paper by increasing or decreasing the level of contrast as desired. The contrast increase and contrast decrease signals from the keyboard, as described above, are processed by the microprocessor to influence the temperature control of the heaters. Also, the microprocessor produces a contrast read-out signal on pins 22 through 25 which is applied to the data input pins 20 through 23 of the decoder 312. The decoder 312 controls the energization of a contrast indicator 356 which is of the bar-type and is comprised of the set of LEDs (not shown). Each of the output pins 1 through 17 of the decoder 312 is connected to a separate LED in the indicator and the height of the bar represented by the lighted LED's, with reference to a normal level, indicates the degree of increase or decrease of the contrast called for by the operator.

The buffer 306 is adapted to apply control signals developed by the microprocessor 300 to the respective controlled devices including the heaters, fans and the control relay. For this purpose, the microprocessor develops a control relay signal on pin 18 which is connected to pin 6 of the buffer. The output pin 14 of the buffer applies the control relay signal through connector k to the transistor 236 which energizes the control relay 232. The microprocessor develops a control signal for heater 114 on pin 13 which is connected with pin 13 of the buffer 306. The output pin 7 of the buffer applies the heater control signal through the connector g to the control terminal of the solid state relay 252. Similarly, the microprocessor develops a control signal for heater 112 on pin 14 which is connected with pin 11 of the buffer 306. The output pin 9 of the buffer is connected through connector f to the control terminal of the solid state relay 248 for controlling energization of heater 112. The microprocessor develops a heater control signal on microprocessor pin 15 which is connected with the buffer pin 15. This signal is developed on the output pin 5 of the buffer which is connected through connector h to the control terminal of solid state relay 254 for control of the heater 116. Similarly, the microprocessor develops a heater control signal for heater 118 on pin 16 which is connected with the input pin 2 of the buffer 306. This control signal is developed on the output pin 10 of the buffer which is connected through the connector i to the control terminal of the solid state relay 256 which controls the energization of the heater 118. The microprocessor develops a fan control signal on pin 17 which is connected with the input pin 4 of the buffer 306. The fan control signal is developed on output pin 16 of the buffer which is connected through connector j to the control terminal of solid state switch 244 which controls the energization of fans 94 and 96.

Each of the control signals for the respective heaters and fans developed by the microprocessor, as discussed above, is a pulse signal comprising a train of pulses having a pulse duration corresponding to the cycle time of the 60 Hz supply line voltage and having a repetition rate determined by the microprocessor. Thus, the energization, i.e. the heat generated by an individual heater is determined by the pulse repetition rate of the heater control signal. Similarly, the energization and hence the speed of the fans is determined by the pulse repetition rate of the fan control signal.

In the operation of the heaters, any one or any combination of the four heaters 112, 114, 116 and 118 may be energized at a time depending upon the amount of heat required for optimal development of the paper. The selection of the heater or heaters which is turned on is determined by the microprocessor and the turn on and turn off is effected by the control signal for a given heater. When a given heater is selected, for energization, it is pulsed at such a repetition rate by its control signal that the heater temperature, as measured by the respective thermistor, is held at 280° F. This temperature is maintained by the control signal so long at the heater remains energized and regardless of the speed of the paper. The speed of the paper may vary from 0 to about 100 mm per second. When the speed is 0, all the heaters are turned off and the fans are operated at a speed necessary to reduce the heater temperature a stand-by temperature of 140°. When the paper is moving at a speed lower than about 5 mm per second, it is considered to be at standstill or equivalent to 0 speed. When the paper speed is greater than 5 mm per second then one or more of the heaters is energized and maintained at a temperature of 280° F. for so long as it remains energized. As the speed of the paper increases, the dwell time is decreased and hence a greater amount of heat must be applied to obtain optimal development of the paper. The quantity of heat supplied to the paper is varied by the selective energization of the heaters. As the requirement for heat increases with increasing speed, the heaters are energized in sequence with heater 112, 114, 116 and 118 being energized in that sequence. When the temperature of a given heater approaches 280°, the fans are energized by a pulse rate corresponding to the rate of approach to the operating temperature so that the speed of the fan is regulated to hold the temperature at the desired 280° value. If for some reason, the temperature of any heater reaches an over-temperature level, say 350° F., the heaters are shut-off and the fans are energized at high speed to produce fast cooling.

Operation

In operation, the temperature control system of the developer is controlled by the microprocessor in response to the paper speed signal and the temperature signals, as described above. The microprocessor, operating under program control, produces heater control signals and fan control signals which are of variable pulse rate to vary the degree of energization of the heaters and the speed of the fans. The operation of the temperature control system will be further described with reference to the flow charts of FIGS. 7A and 7B.

Figure 7A:
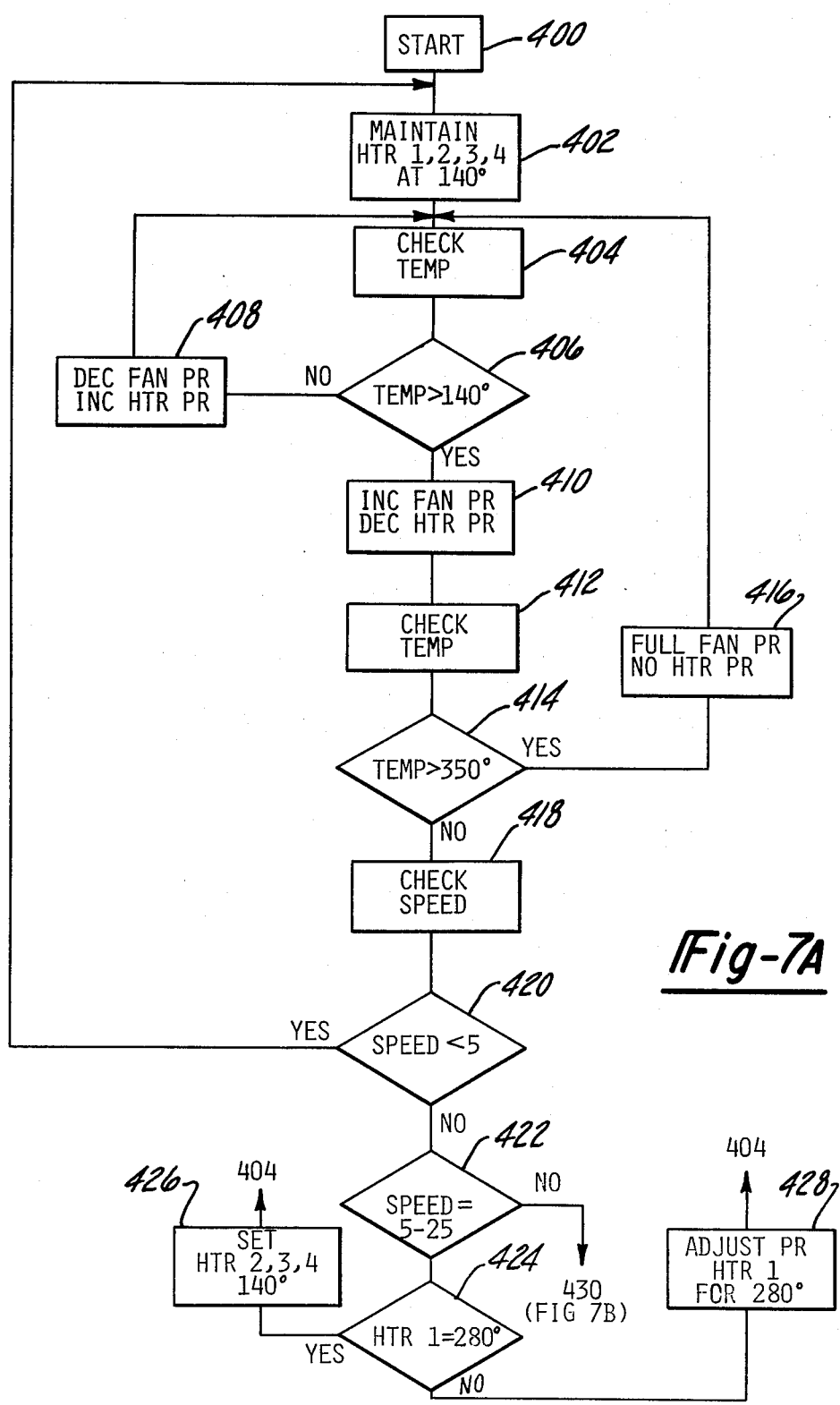
FIGS. 7A and 7B constitute a flow chart representing operation of the temperature control system.
Figure 7B:
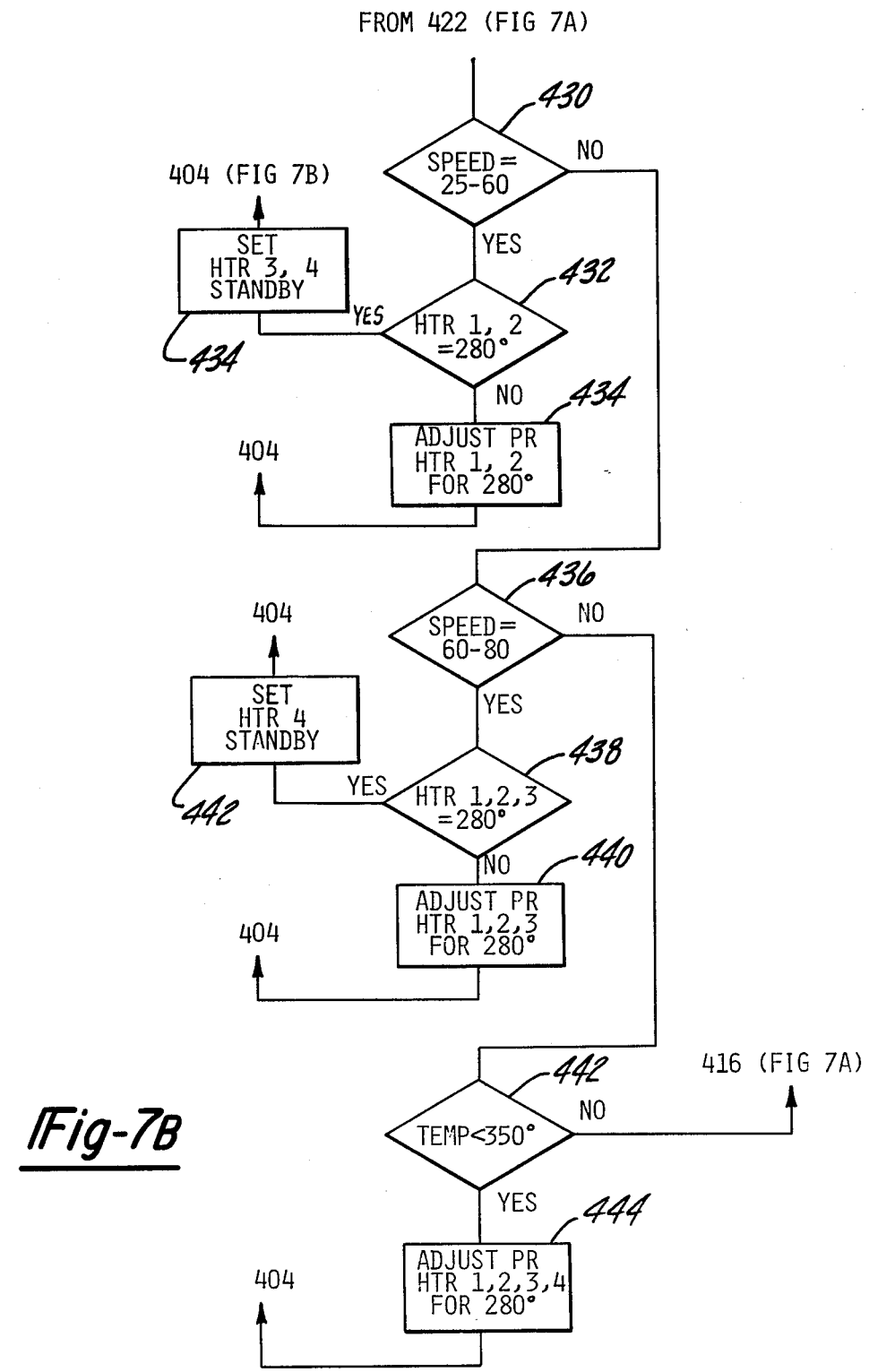

Referring now to FIG. 7A, the temperature control system is initiated by the block 400 and then the program advances to block 402. Block 402 maintains heaters 1, 2, 3 and 4 (corresponding respectively to heaters 112, 114, 116 and 118) at the standby temperature of 140° F. The program advances to block 404 which checks the thermistors to determine the temperature of the heaters. A test block 406 determines whether the temperature reading is greater than 140° F. If the answer is no, the program proceeds to block 408 which decreases the fan pulse rate and increases the heater pulse rate to reduce the temperature. The program then loops back to block 404. If at test block 406 the answer is yes, the program advances to block 410 which increases the fan pulse rate and decreases the heater pulse rate to cool the heaters. In block 412 the temperature is checked again and the program advances to the test block 414 which determines whether the temperature exceeds the over-temperature condition of 350°. If the answer is yes, the program proceeds to block 416 which supplies full fan pulse rate and turns off the heaters. The program then loops back to block 404. If the answer at test block 414 is no, the block 418 checks the paper speed by reading the encoder value. Test block 420 determines whether the paper speed is less than 5 mm per second which is considered equivalent to standstill. If the answer is yes, the program loops back to block 402. If the answer is no, i.e. the paper speed is over 5 mm per second, the program advances to test block 422. Test block 422 determines whether the paper speed is in the range of 5 to 25 mm per second which is the low speed range and which requires low temperature for optimal paper development. If the answer is yes, the program advances to test block 424 which determines whether the temperature of heater 1 is equal to 280°, the desired heater temperature for developing. If the answer is yes, the program advances to block 426 which sets heaters 2, 3 and 4 at the standby temperature of 140°. Then the program loops back to block 404. In this mode, the paper is moving in the low speed range of 5 to 25 mm per second and optimal development is obtained by operating heater 1 at 280° with the other heaters in standby. If test block 424 determines that the temperature of heater 1 is not equal to 280° the program advances to block 428 which is operative to adjust the pulse rate of heater 1 to obtain the desired 280° temperature.

If the test block 422, which checks for the low speed range of 5 to 25 mm per second, determines that the paper speed is in that range, then the program advances to test block 430. Test block 430 determines whether the paper speed is in the first intermediate range of 25 to 60 mm per second. If the answer is yes, the program advances to test block 432 which determines whether heater 1 and heater 2 are operating at 280°. If the answer is yes, the program advances to block 434 which sets heater 3 and heater 4 for operation at the standby temperature. Then, the program loops back to block 404 where the temperature is checked again. In this mode, the paper speed is in the first intermediate speed range and both heaters 1 and 2 are operating at the desired temperature of 280° for optimal paper development. Heaters 3 and 4 are operated in the standby mode. If the answer at test block 432 is no, the program advances to block 434 which adjusts the pulse rate of heaters 1 and 2 to obtain a temperature of 280°. From block 434 the program loops back to block 404 where the temperature is checked again.

If the test block 430 determines that the paper speed was not in the first intermediate range of 25 to 60 mm per second, then the program advances to the test block 436. Block 436 determines whether the paper speed is in the second intermediate speed range of 60 to 80 mm per second. If the answer is yes, the program advances to block 438 which determines whether heaters 1, 2 and 3 are operating at 280°. If the answer is no, the program advances to block 440 which adjusts the pulse rates for heaters 1, 2 and 3 to obtain the operating temperatures of 280°. From block 440 the program loops back to block 404 where the temperature is checked again. If the test block 438 determines that heaters 1, 2 and 3 are operating at 280°, the program advances to block 442 which sets heater 4 for operation in the standby condition and the program loops back to block 404. In this mode of operation, the paper is moving at a speed in the second intermediate speed range of 60 to 80 mm per second and heaters 1, 2 and 3 are operating at 280° to produce optimal development of the paper. Heater 4 is operating in the standby condition.

If it is determined by test block 436 that the paper speed is not in the second intermediate speed range of 60 to 80 mm per second, the program advances to test block 442. At this point in the program, the results of the test blocks which check paper speed show that the paper speed is in excess of 80 mm per second and hence in the high speed range. In the high speed range, all of the heaters are operated at 280° to obtain optimal development. In the test block 442, the temperature is checked to see if it is less than the overtemperature value of 350°. If the answer is no, the program loops back to block 416 which sets full fan pulse rate and turns the heaters off. If the answer at test block 442 is yes, the program advances to block 444 which adjusts the pulse rates for heaters 1, 2, 3 and 4 to obtain the operating temperature of 280°. This produces the optimal development of the paper in the high speed range.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A developer for developing photothermographic paper,
    paper drive means for moving the paper at different speeds along a path through a developing station,
    a heater platen at said station and having a surface over which the paper is moved,
    a plurality of electric resistance heaters disposed on said platen along the path of the paper,
    means for developing a speed signal corresponding to the speed of the paper,
    control mean responsive to said speed signal for activating selected number of said heaters in accordance with the value of said speed signal,
    means for producing a temperature signal corresponding to the temperature of the platen at the location of each of the heaters,
    said control means individually electrically energizing each of said heaters,
    and being responsive to the respective temperature signals for controlling the energization of each of the activated heaters so that the temperature at the respective location is maintained at a predetermined value,
    whereby optimal development of said paper is obtained regardless of speed changes.

2. The invention as defined in claim 1 wherein, said platen is constructed of thin sheet metal having high thermal conductivity and low thermal inertia.

3. The invention as defined in claim 2 including: an enclosure disposed exteriorly of said platen whereby said paper path extends between the platen and the enclosure.

4. The invention as defined in claim 3 including: air supply means for forcing air flow over said heaters for cooling the platen.

5. The invention as defined in claim 4 wherein, said air supply means comprises an intake fan disposed at one side of the platen and a discharge fan disposed at an opposite side of said platen.

6. The invention as defined in claim 5 wherein, said intake fan has an annular discharge passage and the discharge fan has an annular intake passage.

7. The invention as defined in claim 6 including: an air flow guide extending between the fans to confine the air flow therebetween to an annular passage aligned with the annular passages of the fans.

8. The invention as defined in claim 1 wherein, said platen is U-shaped in cross-section, said paper drive means includes means for moving the paper from a supply compartment with the paper engaging an exterior surface of the platen, said heaters are disposed on an interior surface of the platen at respective sections of the platen along the path of the paper, and said control means includes means for energizing selected ones of said heaters at a time to produce a predetermined temperature of the respective section of the platen.

9. The invention as defined in claim 8 including: a separate temperature sensing means at each section of the platen, and regulating means responsive to the temperature sensing means for regulating the temperature of the selected heaters at the predetermined temperature.

10. The invention as defined in claim 9 including: means for regulating the temperature of the nonselected heaters at a standby temperature which is lower than the predetermined development temperature.

11. The invention as defined in claim 9 wherein, said regulating means includes means for supplying a separate electrical pulse train to each of said heaters for energization thereof, said pulse train having a variable repetition rate for changing the temperature toward the predetermined valve.

12. The invention as defined in claim 9 including: air supply means for forcing air flow over said heaters for cooling said platen, said regulating means being responsive to said temperature sensing means for controlling the energization of the air supply means for regulating the temperature of selected heaters at the predetermined temperature.

13. The invention as defined in claim 12 wherein, said regulating means includes means for supplying a separate train of electrical pulses to each of said air supply means for energization thereof, said pulses train having a variable pulse repetition rate for changing the temperature toward the predetermined value.

14. The invention as defined in claim 13 wherein, said regulating means includes means responsive to an over-temperature value, which exceeds said predetermined temperature by a predetermined amount for deenergizing the heaters and for energizing the air supply means at full speed.

15. The invention as defined in claim 1 including: air supply means at said developing station for producing air flow over said heaters for cooling the platen, said control means including means for energizing said air supply means in response to said temperature signal.

16. The invention as defined in claim 1 wherein, said control means includes means for producing a separate train of electrical pulses for energizing each of said heaters, said pulse train having a variable repetition rate in accordance with the temperature signal to change the temperature of the heaters toward said predetermined value.

17. The invention as defined in claim 15 wherein, said control means includes means for producing a separate train of electrical pulses for energizing each of said heaters and for energizing said air supply means, said pulse train having a variable repetition rate in accordance with said temperature signal for changing the temperature of said platen toward the predetermined value.

18. The invention as defined in claim 16 wherein, said control means comprises a microprocessor.

19. The invention as defined in claim 17 wherein, said control means comprises a microprocessor.

* * * * *